United States Patent [19]
Wassen

[11] Patent Number: 4,954,933
[45] Date of Patent: Sep. 4, 1990

[54] DEVICE FOR ADJUSTING THE AIMING DIRECTION OF A MOTOR VEHICLE HEADLIGHT

[75] Inventor: Charles Wassen, Bobigny, France

[73] Assignee: Valeo Vision, Bobigny, France

[21] Appl. No.: 409,020

[22] Filed: Sep. 18, 1989

[30] Foreign Application Priority Data

Sep. 22, 1988 [FR] France .................. 88 12370

[51] Int. Cl.$^5$ ............................. B60Q 1/06
[52] U.S. Cl. ........................ 362/66; 362/70; 362/271
[58] Field of Search ............ 362/66, 70, 271, 419, 362/428

[56] References Cited

U.S. PATENT DOCUMENTS

| | | | |
|---|---|---|---|
| 4,333,131 | 6/1982 | Hujimoto et al. | 362/372 |
| 4,336,572 | 6/1982 | Takata | 362/66 |
| 4,578,740 | 3/1986 | Krizmanic | 362/66 |
| 4,709,306 | 11/1987 | Harris et al. | 362/66 |
| 4,761,717 | 8/1988 | McMahan et al. | 362/66 |
| 4,881,152 | 11/1989 | Watanabe et al. | 362/66 |
| 4,903,173 | 2/1990 | Mochizuki et al. | 362/66 |

FOREIGN PATENT DOCUMENTS 2186372 1/1974 France .
2410213 6/1978 France .

Primary Examiner—Ira S. Lazarus
Assistant Examiner—Richard R. Cole

[57] ABSTRACT

The disclosure concerns a device for adjusting the aiming direction of a motor vehicle headlight reflector, said device comprising three essentially localized bearing points to support said reflector against a relatively fixed structure, the three bearing points being placed at the three apexes of a triangle having one horizontal side, one of said points being fixed and the other two points being adjustable through shifting in a direction that is essentially perpendicular to the plane of said triangle, to cause heightwise and lateral variation in the aiming direction of the reflector, and further comprising driving means capable of moving at least one of the two adjustable points, wherein the two adjustable bearing points are located on one and the same lateral side of the headlight, opposite the fixed support, the driving means include a single driving member, and means are provided for selectively connecting the driving member to a first adjustable bearing point, which is horizontally aligned with the fixed bearing point, or fixing in position said adjustable bearing point, while said driving member is permanently connected to the second adjustable bearing point so as to determine the two modes of adjustment.

9 Claims, 3 Drawing Sheets

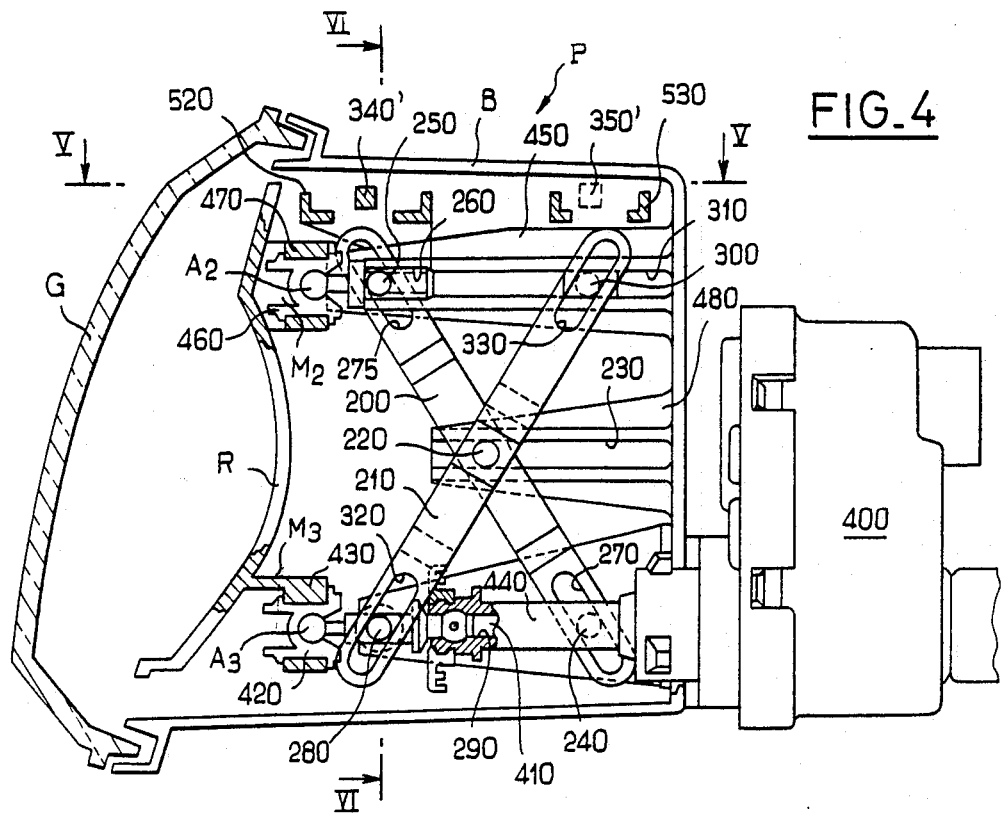

DEVICE FOR ADJUSTING THE AIMING DIRECTION OF A MOTOR VEHICLE HEADLIGHT

BACKGROUND OF THE INVENTION

1. Field of the Invention

The present invention generally pertains to the adjustment of the orientation (namely the aiming direction) of the beams emitted by headlights, notably motor vehicles. It more particularly concerns an improved device for the heightwise and widthwise adjustment of the aiming direction of the reflector of such headlights or of the whole headlight assembly.

2. Description of the Prior Art

There already is a known prior art adjusting device in which the reflector is supported, at the rear, on the casing, by means of three bearing points which define the three apexes of a right-angled triangle. The supporting point, corresponding to the right angle of the triangle, is fixed while the other two points are adjustable and respectively enable the heightwise and widthwise adjustment of the aiming direction of the reflector and the light, so that the beam is suitably aligned with respect to the axis of the road.

However, to be able to use a device such as this conveniently and, notably, to be able to do the heightwise adjustment, which is done at the lowest supporting point, from the top of the headlight, it is necessary to provide for an inconvenient and bulky bevel gear system.

In more sophisticated systems of this kind, it is further known to adjust the lower supporting point which determines the heightwise changing of the beam, no longer by a screw or the like but by a small two-way electrical motor controlled by the driver from his seat inside the vehicle. In this case, the widthwise adjustment screw is maintained, so that the adjustment of the aiming direction combines in this case a manual adjustment of the lateral direction, for example by means of a screwdriver, and a heightwise adjustment through a suitable control of the motor.

Thus, in these known devices, only the heightwise setting or pre-setting can be done by modern automated methods that bring into play an automatic control of the movement of the reflector as a function of appropriate photometric measurements, while the directional adjustment still has to be done by hand.

It would however be desirable to be able to use the driving member to perform both types of adjustment. However, in the existing configuration, it would then be necessary to provide firstly mechanical switch-over means selectively assigning the output of the driving organ to either of the two adjustable supporting points and secondly a linkage enabling transmission of the effort required for the adjustment up to the second bearing point which is diagonally opposite the first one. It will be understood that a system of this type would not only increase the complexity of the drive assembly to a considerable extent, but would further cause a substantial increase in the space occupied by the headlight assembly.

Finally, a device is known from the U.S. Pat. No. 4,333,131, wherein the two adjustable bearing points are located on the same lateral side of the headlight. However, here again, there is provision for two distinct driving members (two screws) to determine the two adjustment modes manually.

SUMMARY OF THE INVENTION

The present invention seeks to provide a simple and practical solution to the above problems. More precisely, it is an object of the present invention to enable heightwise and widthwise adjustment of the aiming direction of the reflector using one and the same driving means, such as an electric motor, in a simple and compact way.

To this end, the present invention provides a device for adjusting the aiming direction of a motor vehicle headlight reflector, said device comprising three essentially localized bearing points to support said reflector against a relatively fixed structure, the three bearing points being placed at the three apexes of a triangle having one horizontal side, one of said points being fixed and the other two points being adjustable through shifting in a direction that is essentially perpendicular to the plane of said triangle, to cause heightwise and lateral variation in the aiming direction of the reflector, and further comprising driving means capable of moving at least one of the two adjustable points, wherein:

the two adjustable bearing points are located on one and the same lateral side of the headlight, opposite the fixed support;

the driving means include a single driving member, and means are provided for selectively connecting the driving member to a first adjustable bearing point, which is horizontally aligned with the fixed bearing point, or fixing in position said bearing point, while said driving member is permanently connected to the second bearing point so as to determine the two modes of adjustment.

BRIEF DESCRIPTION OF THE DRAWINGS

Other features, aims and advantages of the present invention will appear more clearly from the following detailed description of a preferred embodiment, given by way of example and made with reference to the appended drawings, wherein:

FIG. 4 is a side elevation view of a concrete embodiment of an adjustment device according to the invention, taken along the line IV—IV of FIG. 5;

FIG. 5 is a top view along the line V—V of FIG. 4; and

DESCRIPTION OF A PREFERRED EMBODIMENT

Figure 1:
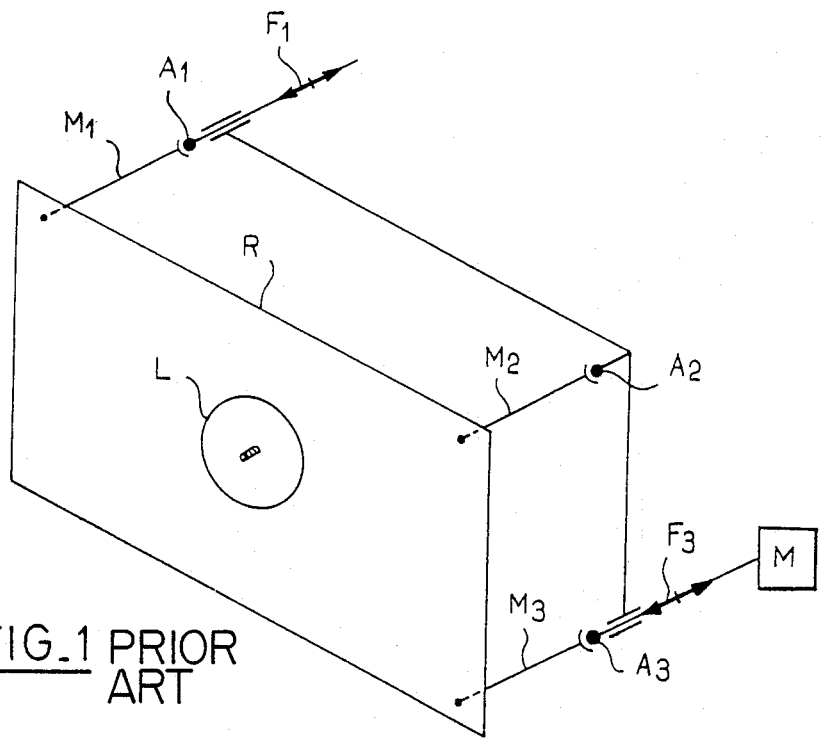
FIG. 1 is a schematic view in perspective of a motor vehicle headlight fitted out with an aiming direction adjustment device according to the prior art.

Referring, firstly, to FIG. 1, a reflector R, represented only by its essentially rectangular contour, fitted out with a bulb L, of a motor vehicle headlight, is supported in a known way on the casing B of said headlight, by means of three stays $M_1$, $M_2$, $M_3$ or similar members, on three essentially localized bearing points $A_1$, $A_2$, $A_3$. These three points together define a right-angled triangle, the point $A_2$ corresponding to the right angle, and the points $A_1$ and $A_3$ being respectively aligned horizontally beside it and vertically thereabove, as shown. Adjusting means, for example in the form of appropriate screw threadings (not shown), are respectively associated with the bearing points $A_1$ and $A_3$ and enable these points to be shifted in a direction that is essentially perpendicular to the plane of the right triangle, along the arrows $F_1$ and $F_3$. Thus, it is clear that the shifting of the bearing point $A_1$ causes a horizontal variation in the aiming direction of the reflector (lateral or directional adjustment of the beam), while the shifting of the bearing point $A_3$ causes a vertical variation in the aiming direction of the reflector (heightwise adjustment of the beam).

When a driving member such as a small electrical motor M is associated with such an adjustment device, it is placed so as to face the lower bearing point $A_3$ and is functionally connected thereto so as to be capable of achieving, by remote control, possibly in an automated way, the heightwise adjustment of the beam emitted by the headlight. In this case, the directional adjustment of the beam is still done manually because, as pointed out, it would be extremely complicated to provide for means for the mechanical switching-over of the mechanical power and a linkage for making the selective connection of the adjusting point $A_1$ to the motor while, at the same time disengaging the connection with the diagonally opposite point $A_3$.

Figure 2:
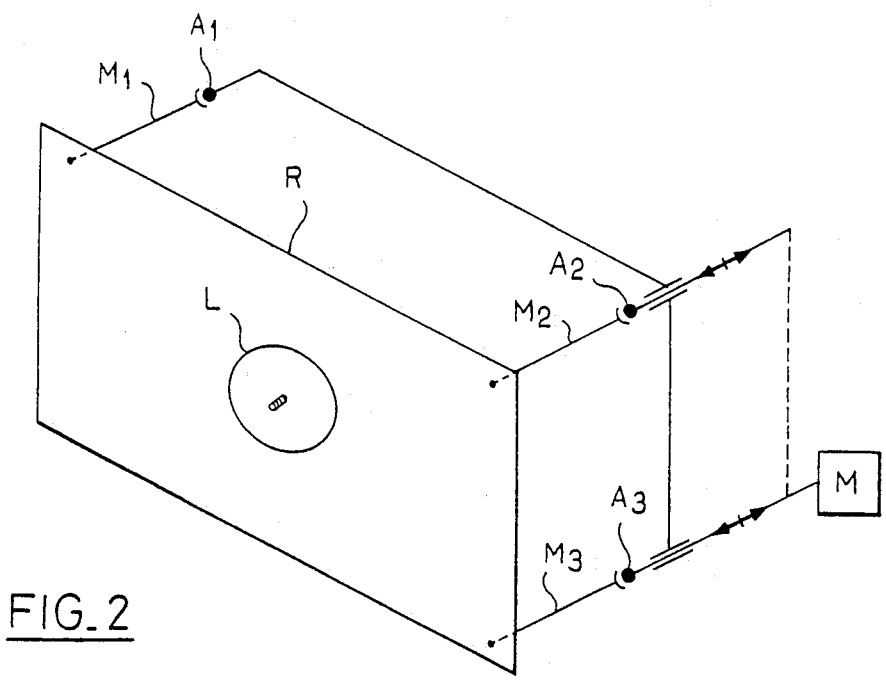
FIG. 2 is a schematic view in perspective of a motor vehicle headlight fitted out with an aiming direction adjustment device according to the present invention.

Referring now to FIG. 2, a first essential aspect of the present invention, within the field three-point devices of this kind, consists in making the bearing point $A_1$ as a fixed point, while the bearing points $A_2$ and $A_3$ are movable. More precisely, when only the bearing point $A_3$ is shifted, while the bearing point $A_2$ is kept fixed, the heightwise adjustment is performed whereas, when the bearing points $A_2$ and $A_3$ are shifted simultaneously, in the same direction and with the same amplitude, the directional adjustment is done, each of the two types of adjustment leaving the other one unchanged. To this end, the point $A_2$ is permanently engaged with the driving member, and it is sufficient to provide a disengageable mechanical connection between said member and the point $A_2$ to be able to make the heightwise adjustment and the widthwise adjustment as desired. Owing to this arrangement according to the invention, it is therefore only necessary to provide for a disengageable linkage between two bearing points of the reflector which are, advantageously, very close to each other and preferably vertically aligned with each other and located on the same side of the casing of the headlight.

Figure 3A:
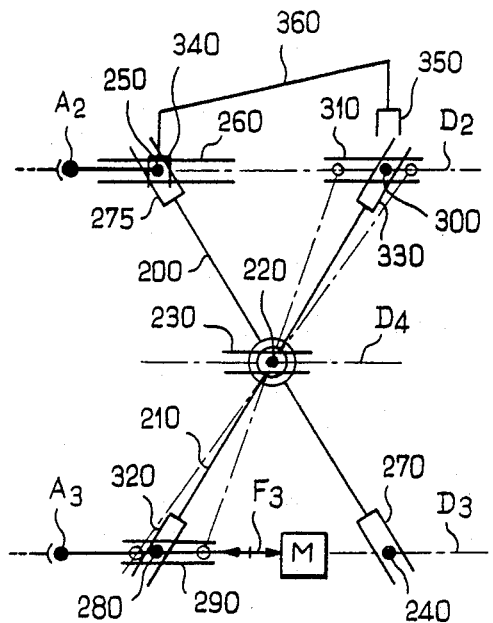
FIGS. 3a and 3b are two side elevation views illustrating the geometry of a part of the device of the invention.
Figure 3B:
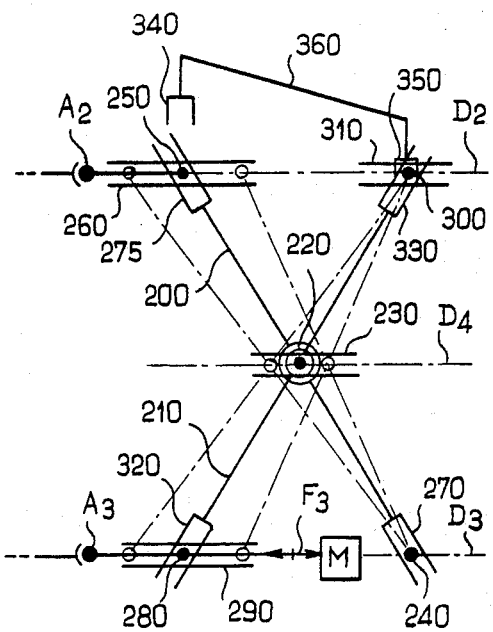

FIGS. 3a and 3b illustrate a preferred principle to fulfil the above function. In these figures, and in the ones that follow, members or parts that are identical or similar to those of FIGS. 1 and 2 are designated by the same references.

FIGS. 3a and 3b are views of the left-hand lateral face of a headlight casing, corresponding to the two bearing points $A_2$ and $A_3$, and the different optical parts of said headlight are not illustrated with a view to simplification. The above-mentioned electrical motor M is coupled to the bearing point $A_3$. According to this invention, the lateral face of the casing has three guide means along essentially horizontal and parallel directions, said directions being designated by $D_2$, $D_3$ and $D_4$. The straight lines $D_2$ and $D_3$ correspond to the essentially horizontal directions along which the two bearing points $A_2$ and $A_3$ are capable of being shifted, while the straight line $D_4$ is parallel to the first two straight lines and located halfway between them.

Practically, two arms 200 and 210 are provided. These arms are arranged crosswise and hinged on a common pivot 220 capable of moving around freely in a horizontal direction in a slideway 230 which defines the straight line $D_4$. The arm 200 is also hinged, at its lower end, on a fixed pivot 240 which is placed on the straight line $D_3$ rearwardly of the bearing point $A_3$ and, at its upper end, on a pivot 250 which is capable of sliding along $D_2$ in a slideway 260 which is fixedly joined to the bearing point $A_2$ for the reflector. For the arm 200 to be capable of making varying aiming directions, it is provided with two end longitudinal slideways 270, 275 in which the pivots 240, 250 can slide.

The arm 210 is further hinged at its lower end on a lower pivot 280 capable of sliding along the straight line $D_3$ in a slideway 290 and fixedly joined to the bearing point $A_3$ for the reflector and is hinged at its upper end on a pivot 300 capable of sliding along $D_2$ in a slideway 310. Like the arm 200, the arm 210 has longitudinal end slideways 320, 330 at its two ends. These longitudinal slideways 320, 330 enable the arm 210 to take up the variations of the distance between its two end pivots 280, 300 during its pivoting.

Finally, there are provided means, which are shown only schematically in FIGS. 3a and 3b, to selectively fix in position either of the two upper pivots 250, 300 in its respective slideway. These means as illustrated are in the form of two forks 340, 350 connected to a common arm 360 which can pivot to take either of the two positions illustrated in FIGS. 3a and 3b, to fix in position either the pivot 250 by means of the fork 340 (FIG. 3a) or the pivot 300 by means of the fork 350 (FIG. 3b).

The device as described works in the following manner: in the case of FIG. 3a, the arm 200 is fixed since these two end pivots are themselves fixed. As a result, the only consequence of the actuation of the driving motor M is the shifting of the bearing point $A_3$ in either direction, the bearing point $A_2$ being fixed by means of the fork 340. It is clear that this corresponds to the mode of "heightwise adjustment" of the reflector, by the pivoting of this reflector around the essentially horizontal and fixed axis passing through the bearing points $A_1$ and $A_2$. It has to be noted that, in this case, the sliding connection of the upper end of the arm 210 enables said arm to follow the motion of the bearing point $A_3$ and of the associated pivot 280 by pivoting around the central pivot 220.

In FIG. 3b, it is the fork 350 that fixes the pivot 300 in position, while the pivot 250 is free to slide horizontally. When the motor M drives the pivot 280 and the bearing point $A_3$ in either direction, a pivoting of the arm 210 is induced, with a consequent shifting of the central pivot 220 along its slideway 230. This shifting in turn induces a corresponding shift of the arm 200 which is hinged at the bottom on the fixed pivot 240, symmetrically with respect to the median, horizontal straight line $D_4$. Consequently, the motion of the arm 200 at its free upper end, which determines the motions of the upper bearing point $A_2$, follows the motion of the lower end of the arm 210, in the same direction and with the same magnitude. The result thereof is that the bearing points $A_2$ and $A_3$ are shifted in the same direction and with the same magnitude under the effect of the motor, and that the reflector thus pivots around an essentially vertical axis parallel to $A_2 A_3$ and passing through the fixed support $A_1$. This determines the mode of directional (i.e. lateral) adjustment of the headlight.

In FIGS. 3a and 3b, lines of dots and dashes are used to show two other possible positions of the arms 200, 210 during the adjustment of the aiming direction of the reflector.

Figure 6:
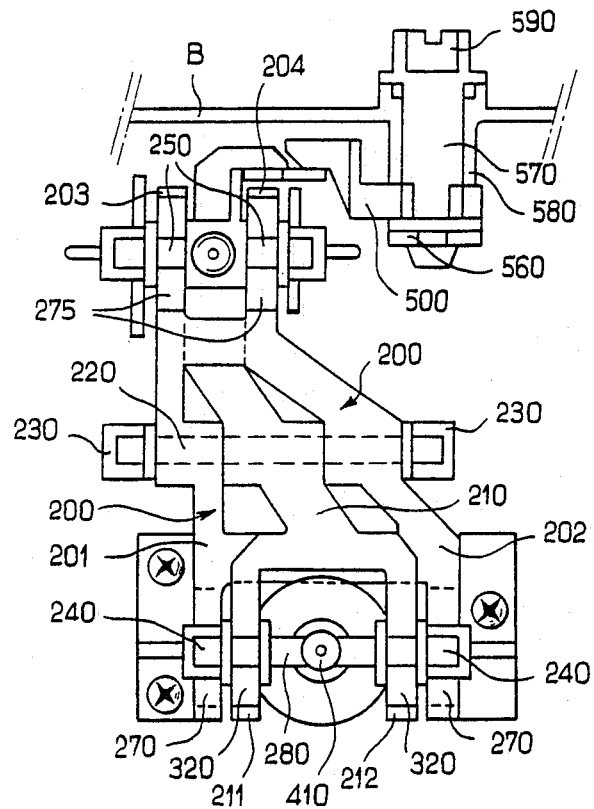
FIG. 6 is a front elevation view along the line VI—VI of FIG. 4.

With reference, now, to FIGS. 4 to 6, P designates a motor vehicle headlight that embodies the features of the present invention. It comprises a casing B, closed at the front by a closing lens G as well as a reflector R with which there is associated a bulb (not shown). An electric motor and its output gearing are housed in a fixed casing 400, at the rear of the casing B. The rotation of the motor determines a horizontal translational motion, in either direction, of a control rod 410, at the free end (to the left in FIG. 4) of which is provided the bearing point $A_3$ for the reflector. This bearing point $A_3$ is made in a standard way in the form of a sphere onto which an adaptor 420 is elastically snapped. This adaptor 420 is itself firmly fixed in a sheath 430, which is fixedly joined to the reflector R by means of a stay $M_3$. The pivot 240 is made in the shape of a cylindrical rod, projecting on either side of a sheath 440 which is fixedly joined to the casing and receives the sliding rod 410. As for the pivot 280, it is made in the form of a cylindrical rod that is fixedly joined to said rod 410.

In the region of the upper ends of the arms 200, 210, the slideways 260, 310 are designed to be in a cantilever flange 450 that extends frontwards from the rear of the casing B. Here again, the bearing point $A_2$, fixedly joined to the pivot 250, is made in the shape of a sphere onto which an adaptor member 460 gets elastically snapped. This adaptor member 460 is mounted in a sheath 470 connected to the reflector R by means of the stay $M_2$.

Finally, a cantilever flange 480 defines the slideway 230 for the central sliding pivot 220 of the two arms 200, 210.

As can be seen, the longitudinal end slideways 270, 275, 320 and 330 of the two arms are defined by elongated slots closed at both their ends.

It can be seen in FIG. 6 that the arms 200 and 210 are each divided, in their lower region, into two parallel branches, respectively 201, 202 and 211, 212 which encompass the sliding rod 410. Thus, the stresses developed during the adjustment operations are prevented from being exerted slantwise, and the risks of jamming are reduced to a minimum. Similarly, in its upper region, the arm 200 gets divided into two parallel branches 203, 204. This arrangement is, of course, also possible for the upper end of the arm 210.

In this practical embodiment of the invention, the means to alternately fix in position and release the upper pivots 250, 300 include an essentially horizontal, member 500 in the form of a rocker having a pivot 510 with a vertical axis mounted in a notch 515 of the casing. The arm 360' of the rocker has two branches 340', 350' at its ends. These two branches constitute braking shoes for the respective pivots. More precisely, said pivots are respectively secured, in translation, to two superstructures 520, 530 extending above the upper ends of the arms and each having an essentially horizontal plane surface 521, 531, respectively, which the shoe, 340' or 350' respectively, can selectively engage with high friction.

It can be seen that the arm 360' of the rocker has an appendix 540 forming a leaf spring that bears against a relatively fixed part fixedly joined to the casing. This spring enables the mechanical switching-over rocker to be normally biased to the position shown in FIG. 5, which corresponds to the heightwise adjustment of the aiming direction of the reflector. This arrangement is particularly advantageous, as will be seen in detail further below, when only the heightwise adjustment is available to the user from the driver's position inside the vehicle.

The rocker 500 is swung over by means of a toothed wheel 560 which is mounted at the lower end of a rod 570 having a vertical axis and mounted so as to rotate in a sheath 580 formed in the upper face of the casing B. The rotation of this rod 580 is achieved by means of a screwdriver or similar device engaged in a screw head shaped upper part 590. The member 500 has opposite its pivot 510 a toothed sector 600 centered on the axis of said pivot and meshed with the above-mentioned toothed wheel.

The adjustment device can be used as follows: in the factory, after the headlight has been mounted, the rod 570 is made to pivot to place the rocker 500 in its position which locks the pivot 300 (shoe 350' active) in position, and the rod is kept in this position against the force of the spring, for example by means of a special tool. The widthwise adjustment of the beam is then done automatically, through the servo-control of the motor.

By withdrawing the special tool, the rocker 500 biased the leaf spring returns to the position shown in FIG. 5, in which it is the pivot 250 that is locked. The motor-controlled heightwise pre-setting of the beam can then be done in a similar way.

Subsequently, when the special tool is kept withdrawn, only the heightwise adjustment is accessible to the user, by the control of the motor in either direction from the driver's position within the automobile, for example to adapt the height of the beam to the load of the vehicle.

Naturally, it is also possible to change the device so that both adjustment modes are accessible to the user, for example by providing for a remote control of the rod 570 from the driver's position inside the vehicle, for switching from one mode to the other.

Clearly, the present invention is in no way restricted to the above description or to the drawings. In particular, it is clear that the concepts of the present invention could be applied without distinction to the adjustment of the aiming direction of a bulb and reflector assembly of a headlight with respect to its casing and its lens or to the adjustment of a whole headlight or optical unit with respect to the body of the vehicle or other fixed support of the vehicle.

Besides, although we have described and illustrated an embodiment of the invention in which the adjustment is done by bringing the two vertically aligned bearing points $A_2$ and $A_3$ into play, it will be easy for the specialist to adapt the invention to the case where the adjustment is done by the points $A_1$ and $A_2$, the bearing point $A_3$ being then fixed.

Finally, the invention can be implemented in optical units comprising two headlights side by side, to adjust these headlights individually or together.

What is claimed is:

1. A device for adjusting the aiming direction of a motor vehicle headlight reflector, said device comprising three essentially localized bearing points to support said reflector against a relatively fixed structure, the three bearing points being placed at the three apexes of a triangle having one horizontal side, one of said points being fixed and the other two points being adjustable through shifting in a direction that is essentially perpendicular to the plane of said triangle, to cause heightwise and lateral variation in the aiming direction of the reflector, and further comprising driving means capable of moving at least one of the two adjustable points, wherein:

the two adjustable bearing points are located on one and the same lateral side of the headlight, opposite the fixed support;

the driving means include a single driving member, and means are provided for selectively connecting the driving member to a first adjustable bearing point, which is horizontally aligned with the fixed bearing point, or fixing in position said adjustable bearing point, while said driving member is permanently connected to the second adjustable bearing point so as to determine the two modes of adjustment.

2. An adjusting device according to claim 1, wherein the triangle is essentially a right angled triangle, the two adjustable bearing points encompassing a vertical side of said triangle.

3. An adjusting device according to claim 2, wherein the means to selectively connect the driving member to the first adjustable bearing point include two arms pivotally mounted in a central region on a common pivot free to slide horizontally, one of said arms being further pivotally mounted at its lower end, by means of a longitudinal slideway, on a fixed pivot that is located rearwardly of the second adjustable bearing point and pivotally mounted at its upper end, by means of another longitudinal slideway, on a pivot that is fixedly joined to the first adjustable bearing point and is capable of sliding horizontally, while the second arm is further pivotally mounted at its lower end by means of a longitudinal slideway, on a pivot governed by the driving member and fixedly joined to the second adjustable bearing point and pivotally mounted at its upper end, by means of a further slideway, on a pivot located horizontally rearwardly of the first adjustable bearing point and being capable of sliding horizontally, said means further comprising a mechanism that is capable of selectively fixing into position either of the pivots on which the upper ends of the arms are mounted.

4. An adjusting device according to claim 3, wherein said mechanism includes a rocker, a pivoting arm of which bears a locking element at each of its ends.

5. An adjusting device according to claim 4, wherein each locking element is formed by a braking shoe capable of engaging on a braking surface fixedly joined to the respective pivot.

6. An adjusting device according to claim 5, wherein the rocker includes a return spring which biases it towards a stable position in which the first adjustable support is fixed.

7. An adjusting device according to claim 4, wherein the pivoting of the arm of the rocker is determined by a manually actuatable toothed wheel.

8. An adjusting device according to claim 1, wherein the slidable pivots are mounted in slideways fixedly joined to the casing of the headlight.

9. An adjusting device according to claim 1, wherein the driving member comprises an electrical motor.

* * * * *